US012576008B2

(12) United States Patent
Ditore

(10) Patent No.: US 12,576,008 B2
(45) Date of Patent: Mar. 17, 2026

(54) FLEXIBLE CONTAINER ASSEMBLY AND FITMENT ASSEMBLY FOR A FLEXIBLE CONTAINER ASSEMBLY

(71) Applicant: Scholle IPN Corporation, Northlake, IL (US)

(72) Inventor: Steve Ditore, Oswego, IL (US)

(73) Assignee: Scholle IPN Corporation, Northlake, IL (US)

( * ) Notice: Subject to any disclaimer, the term of this patent is extended or adjusted under 35 U.S.C. 154(b) by 17 days.

(21) Appl. No.: 17/232,632

(22) Filed: Apr. 16, 2021

(65) Prior Publication Data

US 2021/0322271 A1 Oct. 21, 2021

Related U.S. Application Data

(60) Provisional application No. 63/145,827, filed on Feb. 4, 2021, provisional application No. 63/011,278, filed on Apr. 16, 2020.

(51) Int. Cl.
*A61J 1/14* (2023.01)
*A61J 1/10* (2006.01)

(52) U.S. Cl.
CPC ............... *A61J 1/1475* (2013.01); *A61J 1/10* (2013.01); *A61J 1/1418* (2015.05); *A61J 1/1462* (2013.01)

(58) Field of Classification Search
CPC .......... A61J 1/1475; A61J 1/1481; A61J 1/10; A61J 1/1418
See application file for complete search history.

(56) References Cited

U.S. PATENT DOCUMENTS 6,106,502 A * 8/2000 Richmond ........... A61M 5/1411 604/246
2008/0029540 A1* 2/2008 Johnson ............. B65D 75/5877 222/83
2011/0180566 A1* 7/2011 Kobashi ................. B65D 47/06 222/105
2013/0269827 A1* 10/2013 Thomas, Jr. .......... A61J 1/2093 141/2
2015/0290081 A1* 10/2015 Kropczynski ......... A61J 1/2082 604/244
2016/0369922 A1* 12/2016 Blake ................. A61M 39/1011
2018/0056056 A1* 3/2018 Law ........................ A61M 1/60
2019/0175447 A1* 6/2019 Wise ...................... A61J 1/2096
2020/0214938 A1* 7/2020 Ding ...................... B01D 69/06
2022/0062104 A1* 3/2022 Andrey ..................... A61J 9/00

* cited by examiner

*Primary Examiner* — Jessica Arble
*Assistant Examiner* — Meagan Ngo
(74) *Attorney, Agent, or Firm* — The Watson IP Group; Jovan N. Jovanovic

(57) ABSTRACT

A flexible container assembly including a bag assembly and a fitment assembly. The bag assembly includes a bag and a spout. The spout includes a base flange and a cylindrical upstand that is in fluid communication with the cavity of the bag. The fitment assembly includes a body and a cap. The body includes a base, having an opening, a depending skirt depending from a lower surface of the base and a upstanding spout extending from the upper surface of the base. Methods of making, filling and using of the flexible container assembly, and the fitment assembly and components thereof are likewise disclosed.

19 Claims, 20 Drawing Sheets

FLEXIBLE CONTAINER ASSEMBLY AND FITMENT ASSEMBLY FOR A FLEXIBLE CONTAINER ASSEMBLY

CROSS-REFERENCE TO RELATED APPLICATION

This application claims priority from U.S. Patent Application Ser. No. 63/011,278, filed Apr. 16, 2020, entitled "FLEXIBLE CONTAINER ASSEMBLY AND FITMENT ASSEMBLY FOR A FLEXIBLE CONTAINER ASSEMBLY", and claims priority from U.S. Patent Application Ser. No. 63/145,827, filed Feb. 4, 2021, entitled "FLEXIBLE CONTAINER ASSEMBLY AND FITMENT ASSEMBLY FOR A FLEXIBLE CONTAINER ASSEMBLY", the entire specification of which is hereby incorporated by reference in its entirety.

BACKGROUND OF THE DISCLOSURE

1. Field of the Disclosure

The disclosure relates in general to packaging assemblies, and more particularly, to a flexible container assembly and also fitment assembly for a flexible container assembly.

2. Background Art

The use of flexible container is known in the art. Eternal feeding systems are known in the art as well. Eternal feeding systems have requirements as to microbes and as to cleanliness. Such feeding systems typically involve the use of rigid containers with caps associated therewith which are coupled to dispensing probes and the like. Problematically, as the feeding fluid is removed, it is difficult to control the ingress of air, as the fixed rigid volume remains. Furthermore there is difficulty associated with the coupling of probes thereto. At the same time, there are difficulties associated with the use of flexible containers in association with eternal feeding, as the requirements thereof are significantly different. The manner of filling and dispensing thereof can be vastly different than the same with rigid containers.

SUMMARY OF THE DISCLOSURE

The disclosure in one aspect is directed to a flexible container assembly comprising a bag assembly with a bag and a fitment assembly. The bag has at least one panel that is sealed with seals to define a cavity and a spout coupled to the at least one panel providing fluid communication with the cavity. The spout has an upstand extending from a base flange. The fitment assembly has a base having a depending skirt and an upstanding spout. The depending skirt is sealingly engageable with the spout of the bag assembly. The upstanding spout further has a proximal end at the base and a distal end spaced apart therefrom defining an outer surface. Threads extend about the outer surface between the proximal end and the distal end, and, an entry cross-sectional configuration at the distal end.

In some configurations, the entry cross-sectional configuration at the distal end includes an aperture that has a circular center with four wing extensions that are evenly spaced around the circumference of the circular center.

In some configurations, the upstanding spout has a cross-sectional configuration that is substantially smaller than the cross-sectional configuration of the upstand.

In some configurations, the upstand is cylindrical and the upstanding spout is cylindrical with the upstand and the upstanding spout being concentric.

In some configurations, the upstanding spout further includes a depending spout extending from the base and being concentric therewith.

In some configurations, the depending spout is concentric with the upstanding spout and has a cross-sectional area that is larger than the upstanding spout.

In some configurations, the depending spout is spaced apart from the depending skirt and concentric therewith.

In some configurations, a tamper evident seal extends across a lower terminal end of the depending spout.

In some configurations, opposite the spout, a opening is provided for purposes of hanging the bag assembly in operation.

In some configurations, the flexible container further comprises a cap threadedly engageable with the threads of the upstanding spout.

In some configurations, the cap further includes an inner surface having an upper end, with a top cylindrical seal depending from the upper end and engageable with the distal end of the upstanding spout outboard of the entry cross-sectional configuration.

In some configurations, the fitment assembly further includes a tamper evident mating engagement on the base thereof. The cap includes engaging fingers configured to engage the tamper evident mating engagement on the base.

In another aspect of the disclosure, the disclosure is directed to a fitment assembly attachable to a bag having a spout. The fitment assembly comprises a base, a depending skirt and an upstanding spout. The depending skirt depends from the base. The upstanding spout extends from the base opposite the depending skirt. The depending skirt is sealingly engageable with the spout of the bag assembly. The upstanding spout further comprises a proximal end at the base and a distal end spaced apart therefrom defining an outer surface. Threads extend about the outer surface between the proximal end and the distal end. An entry cross-sectional configuration is at the distal end. The entry cross-sectional configuration includes an aperture that has a circular center with four wing extensions that are evenly spaced around the circumference of the circular center. A depending spout extending from the base in a direction opposite the upstanding spout, the depending spout spaced apart from the depending skirt.

In some configurations, the depending spout is concentric with the upstanding spout.

In some configurations, the depending spout has a cross-sectional area that is larger than the upstanding spout.

In some configurations, a tamper evident seal extends across a lower terminal end of the depending spout.

In some configurations, the fitment assembly further includes a cap threadedly engageable with the threads of the upstanding spout.

In some configurations, the cap further includes an inner surface having an upper end. A top cylindrical seal depends from the upper end and is engageable with the distal end of the upstanding spout outboard of the entry cross-sectional configuration.

In some configurations, the fitment assembly further includes a tamper evident mating engagement on the base thereof, and the cap includes engaging fingers configured to engage the tamper evident mating engagement on the base.

In another aspect of the disclosure, the disclosure is directed to a method of attaching a probe to a spout comprising the steps of: providing the flexible container assembly of any of the configurations set forth herein, and having a tamper evident seal extending across the upstanding spout; directing a probe through the entry cross-sectional configuration, the probe includes a plurality of threads that are engageable with the threads of the upstanding spout; engaging the threads of the upstanding spout with the threads of the probe; piercing the tamper evident seal with the probe after the step of engagement; and sealingly coupling the probe with the upstanding spout.

In some configurations, the flexible container assembly further includes a cap attached to the upstanding spout, the method further comprising the step of: removing the cap prior to the step of directing the probe.

BRIEF DESCRIPTION OF THE DRAWINGS

The disclosure will now be described with reference to the drawings wherein.

DETAILED DESCRIPTION OF THE DISCLOSURE

Figure 1:
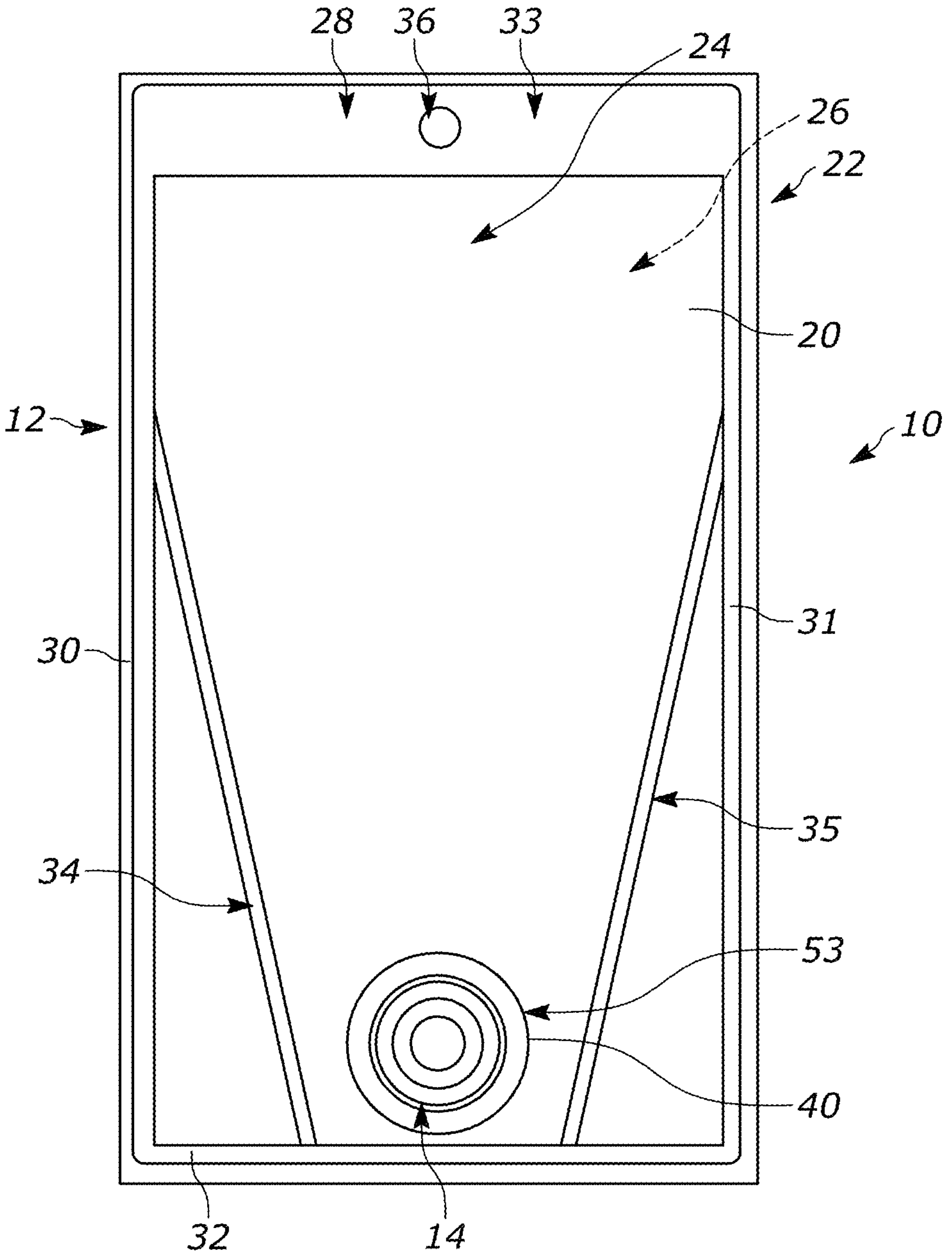
FIG. 1 of the drawings is a top plan view of a configuration of the flexible container assembly of the present disclosure.
Figure 2:
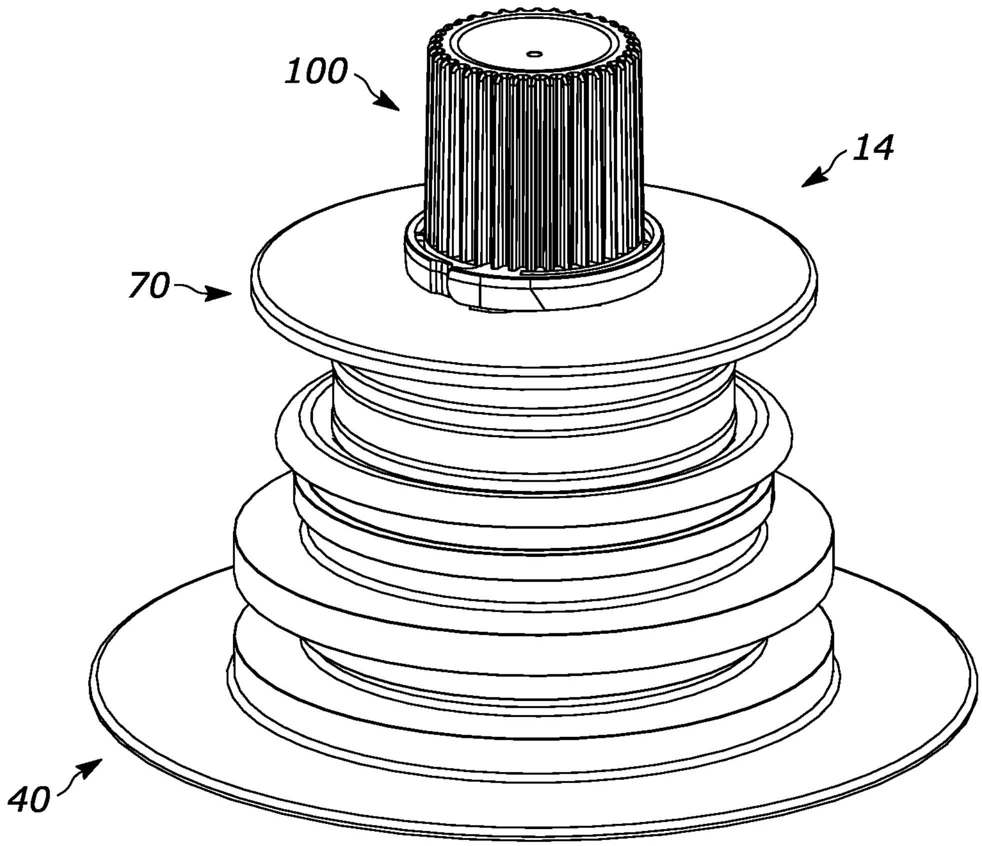
FIG. 2 of the drawings is a perspective view of the fitment assembly coupled to the spout of the bag assembly in a first position.
Figure 3:
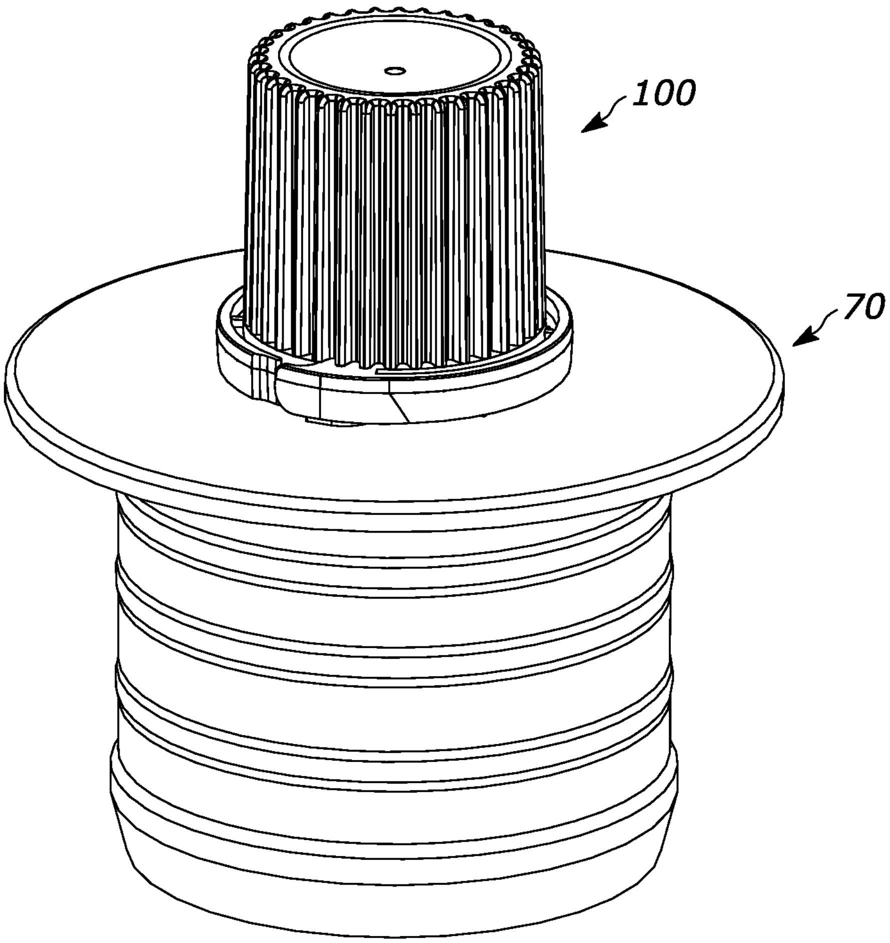
FIG. 3 of the drawings is a perspective view of the fitment assembly of the present disclosure.
Figure 4:
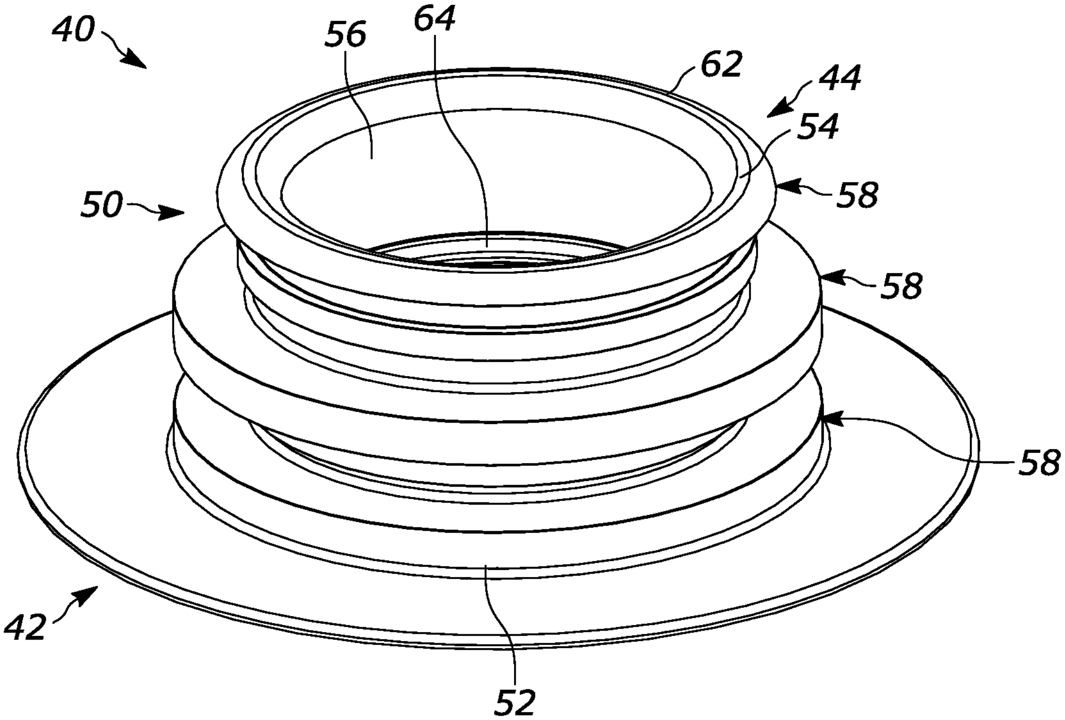
FIG. 4 of the drawings is a perspective view of a spout of the bag assembly of the present disclosure.
Figure 5:
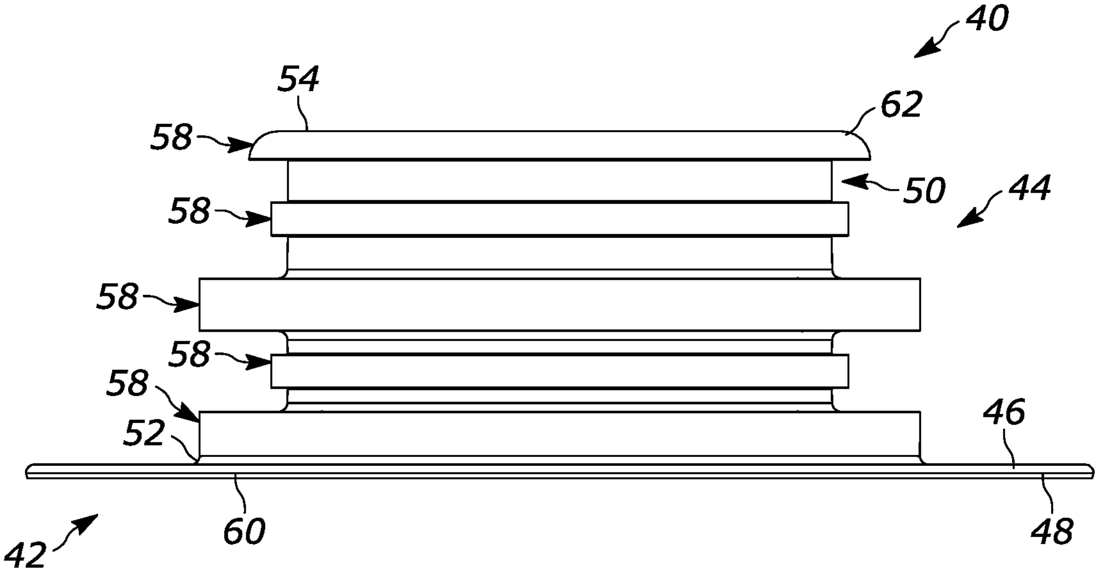
FIG. 5 of the drawings is a side elevational view of a spout of the bag assembly of the present disclosure.
Figure 6:
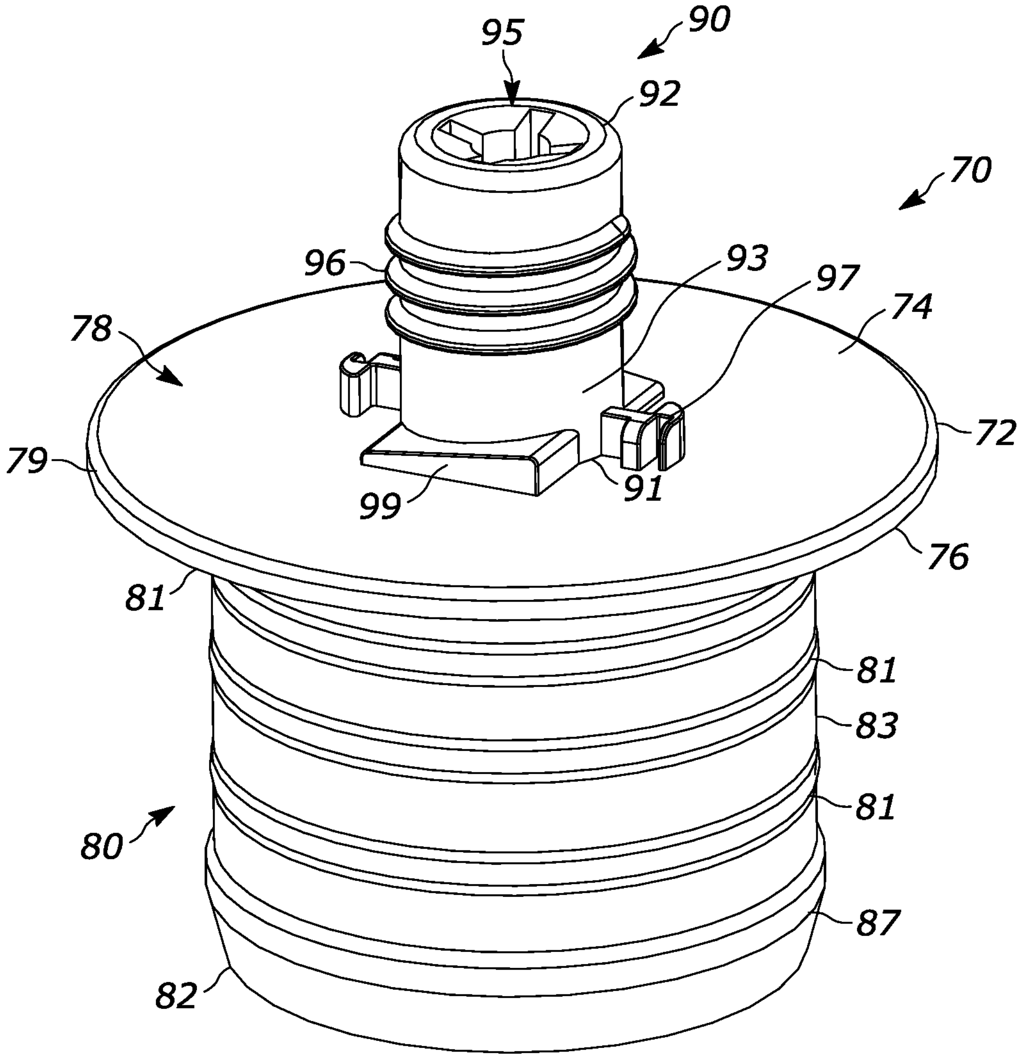
FIG. 6 of the drawings is a perspective view of the body of the fitment assembly of the present disclosure.
Figure 7:
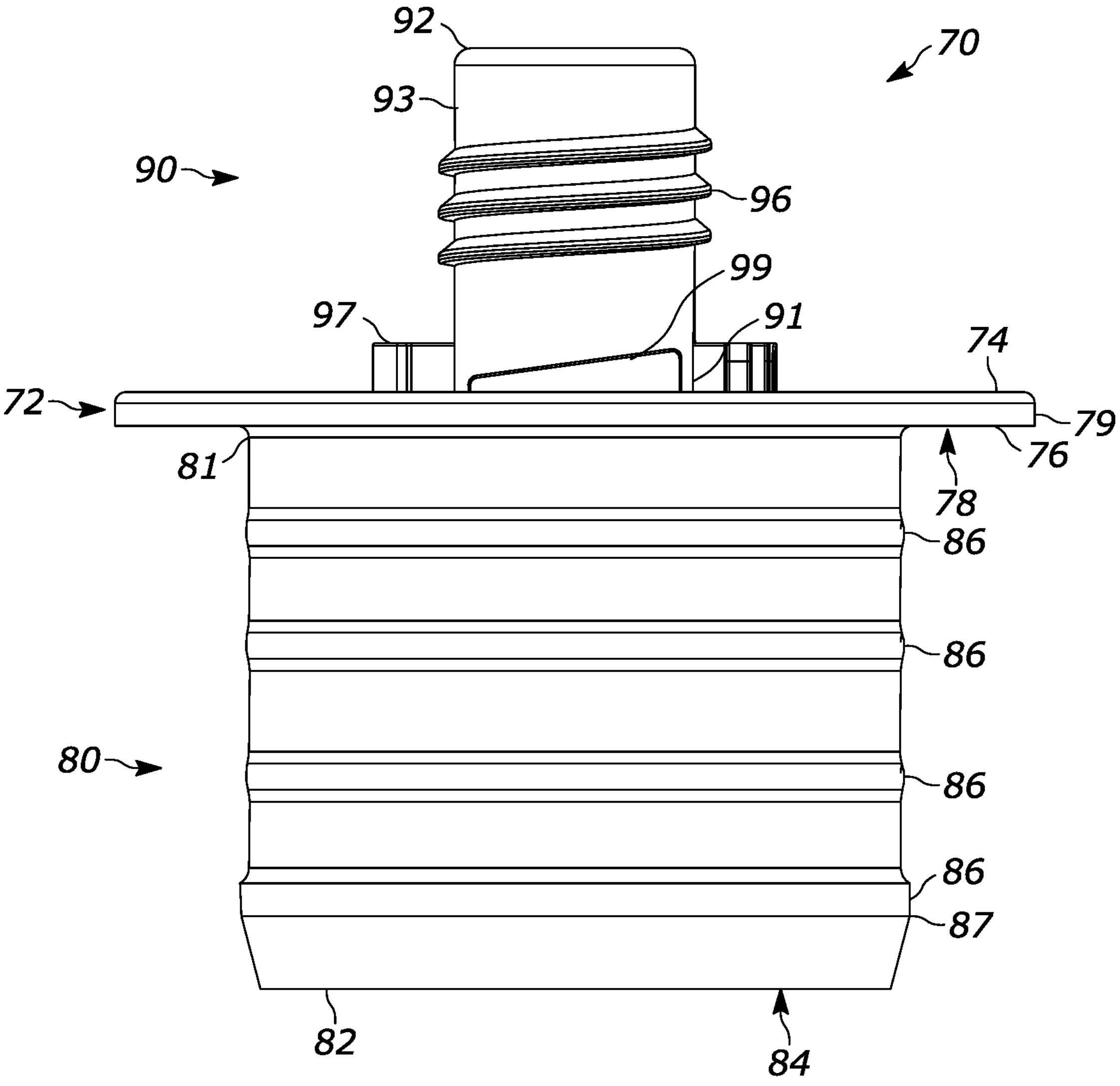
FIG. 7 of the drawings is a side elevational view of the body of the fitment assembly of the present disclosure.
Figure 8:
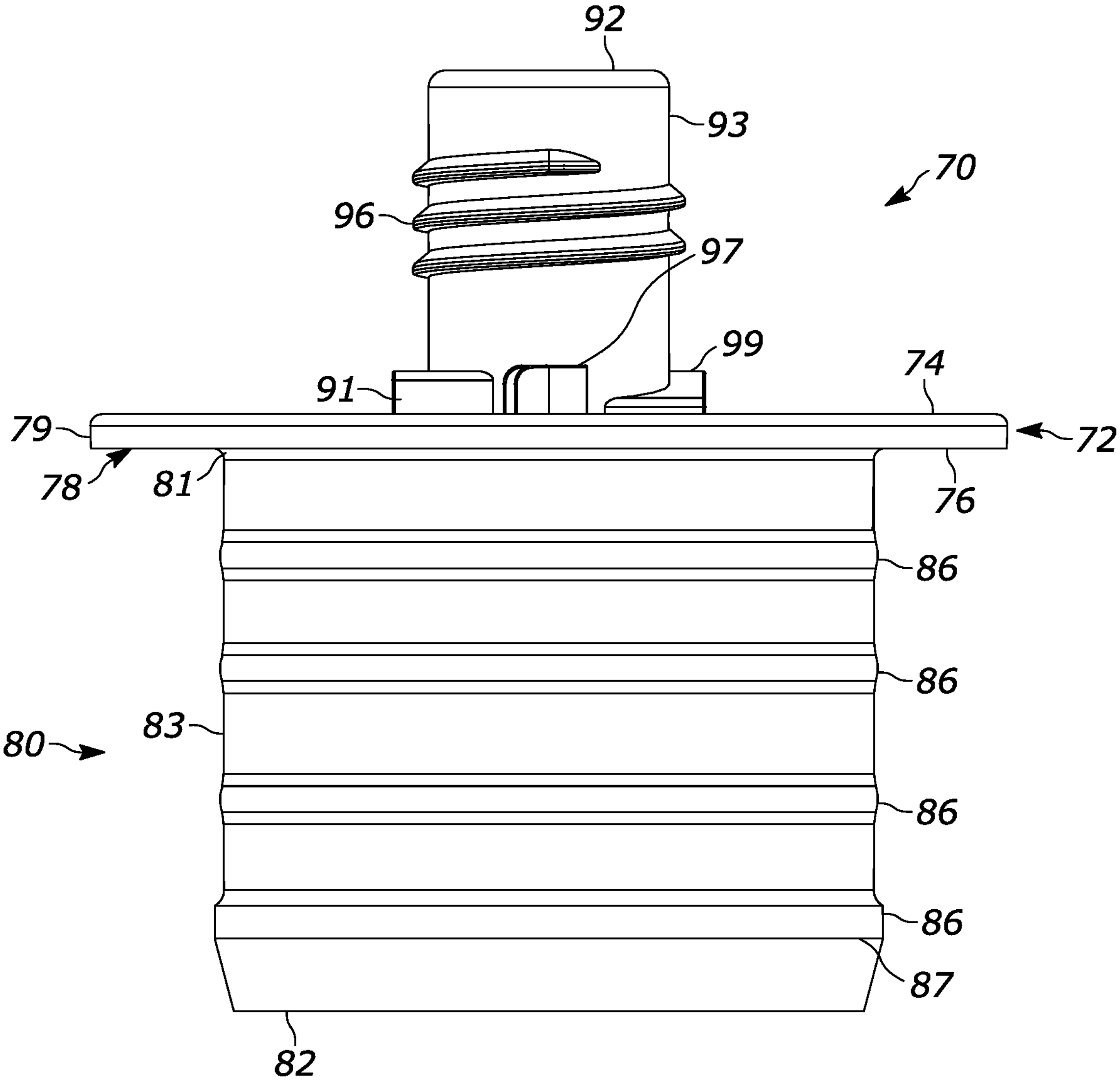
FIG. 8 of the drawings is a side elevational view of the body of the fitment assembly of the present disclosure.
Figure 9:
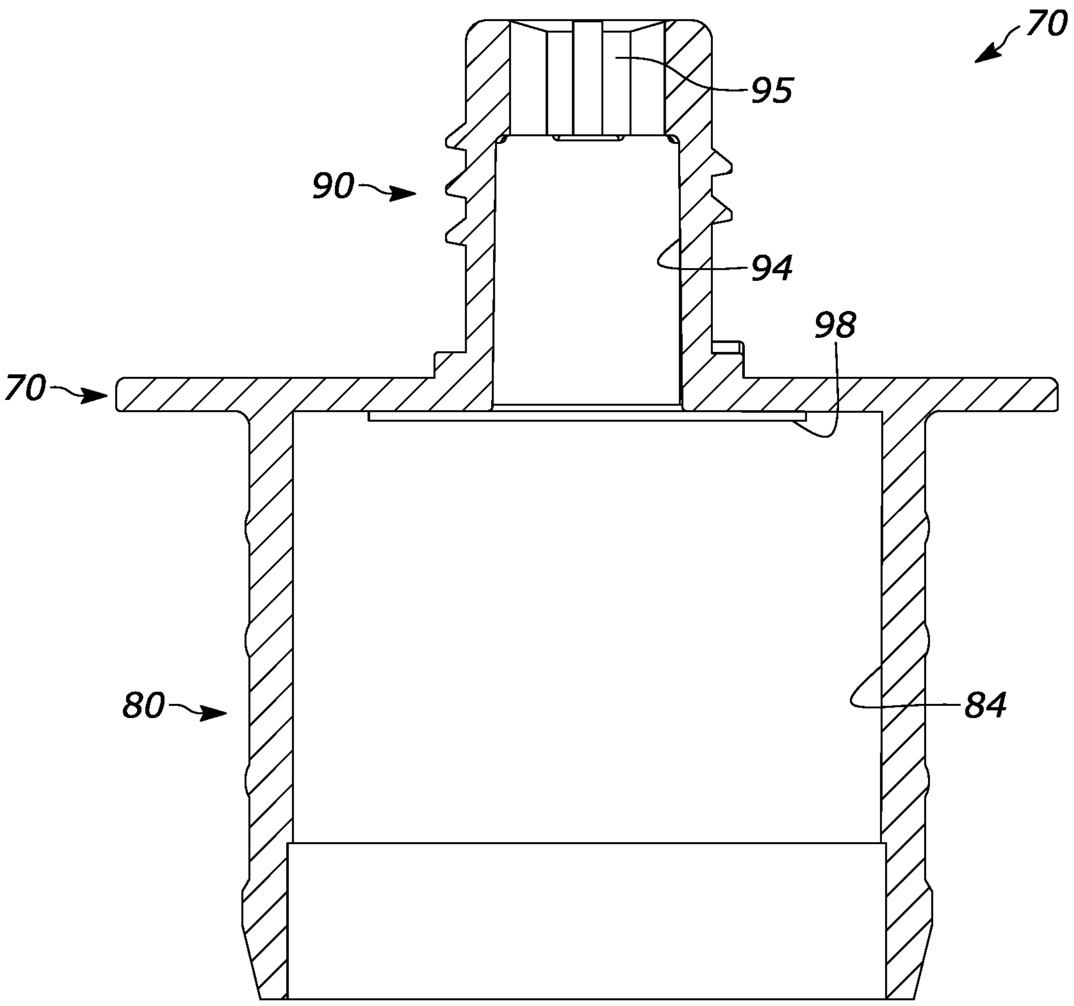
FIG. 9 of the drawings is a cross-sectional view of the body of the fitment assembly of the present disclosure.
Figure 10:
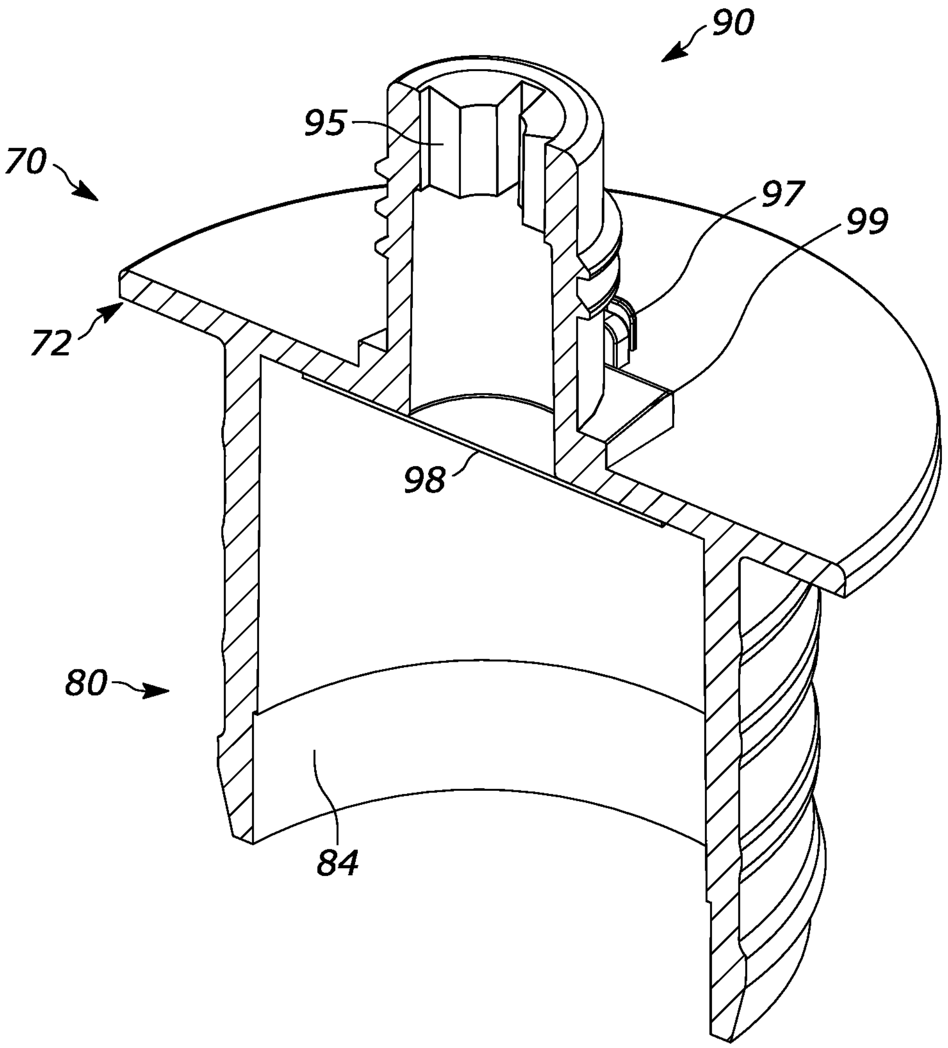
FIG. 10 of the drawings is a perspective cross-sectional view of the body of the fitment assembly of the present disclosure.
Figure 11:
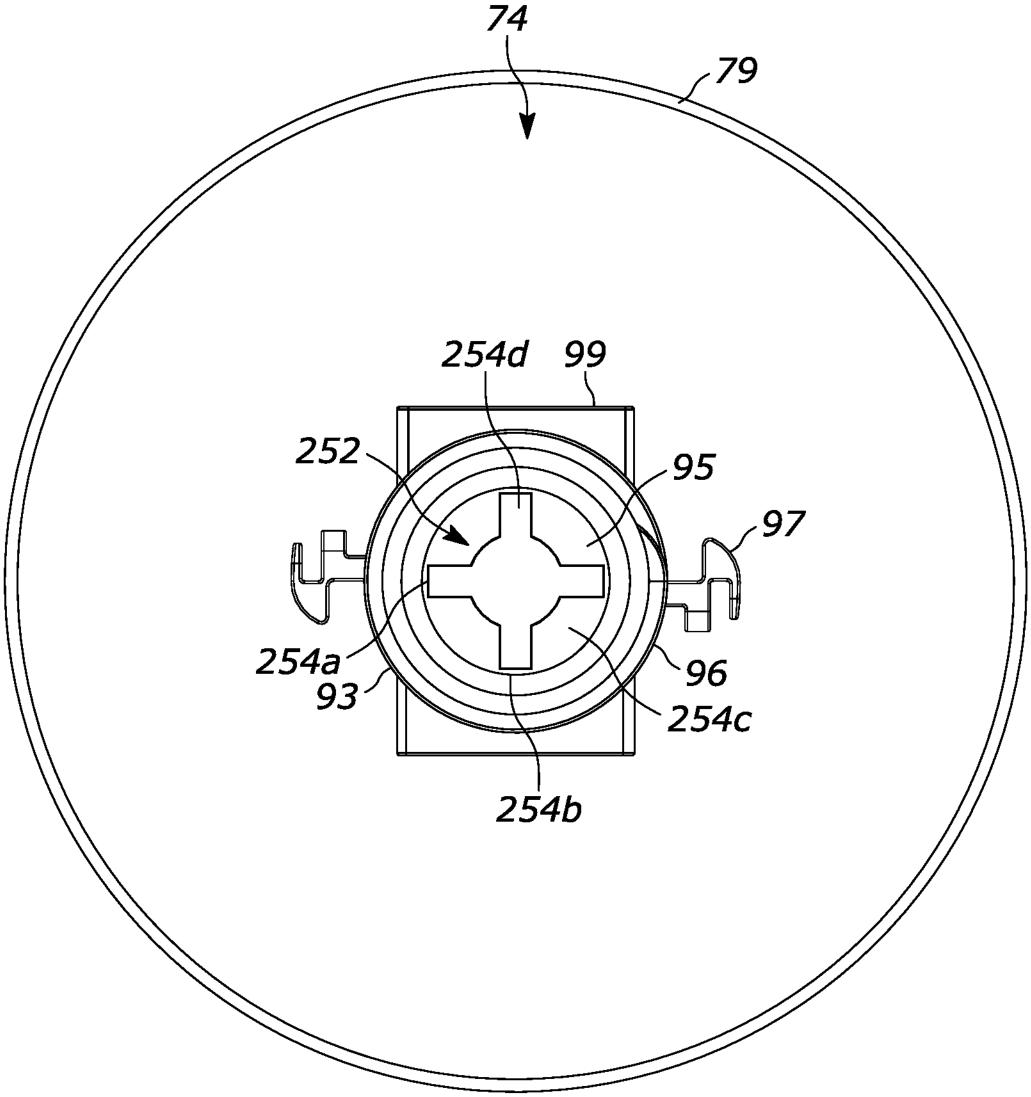
FIG. 11 of the drawings is a top plan view of the body of the fitment assembly of the present disclosure.
Figure 12:
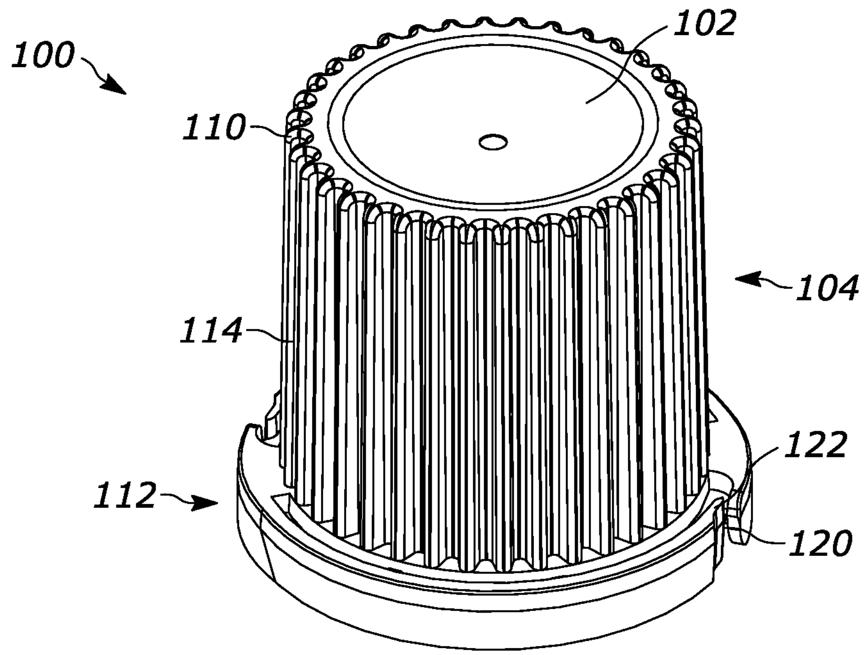
FIG. 12 of the drawings is a perspective view of the cap of the fitment assembly of the present disclosure.
Figure 13:
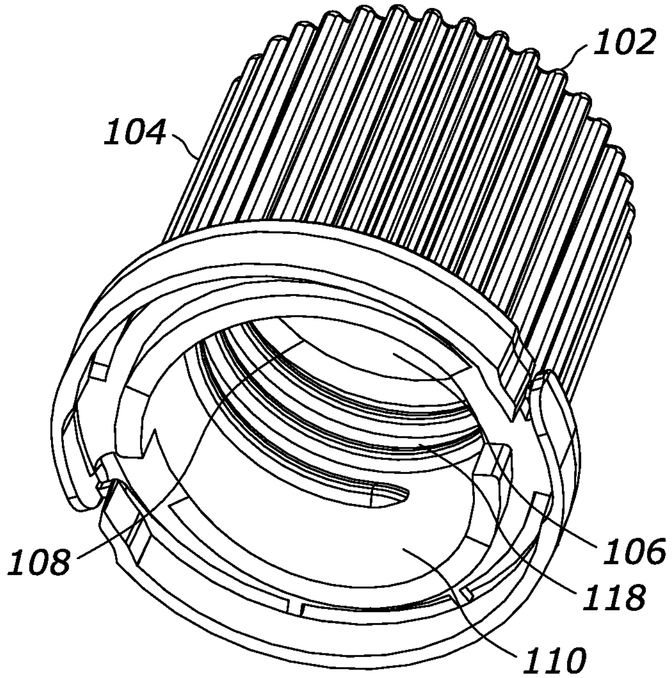
FIG. 13 of the drawings is a bottom perspective view of the cap of the fitment assembly of the present disclosure.
Figure 14:
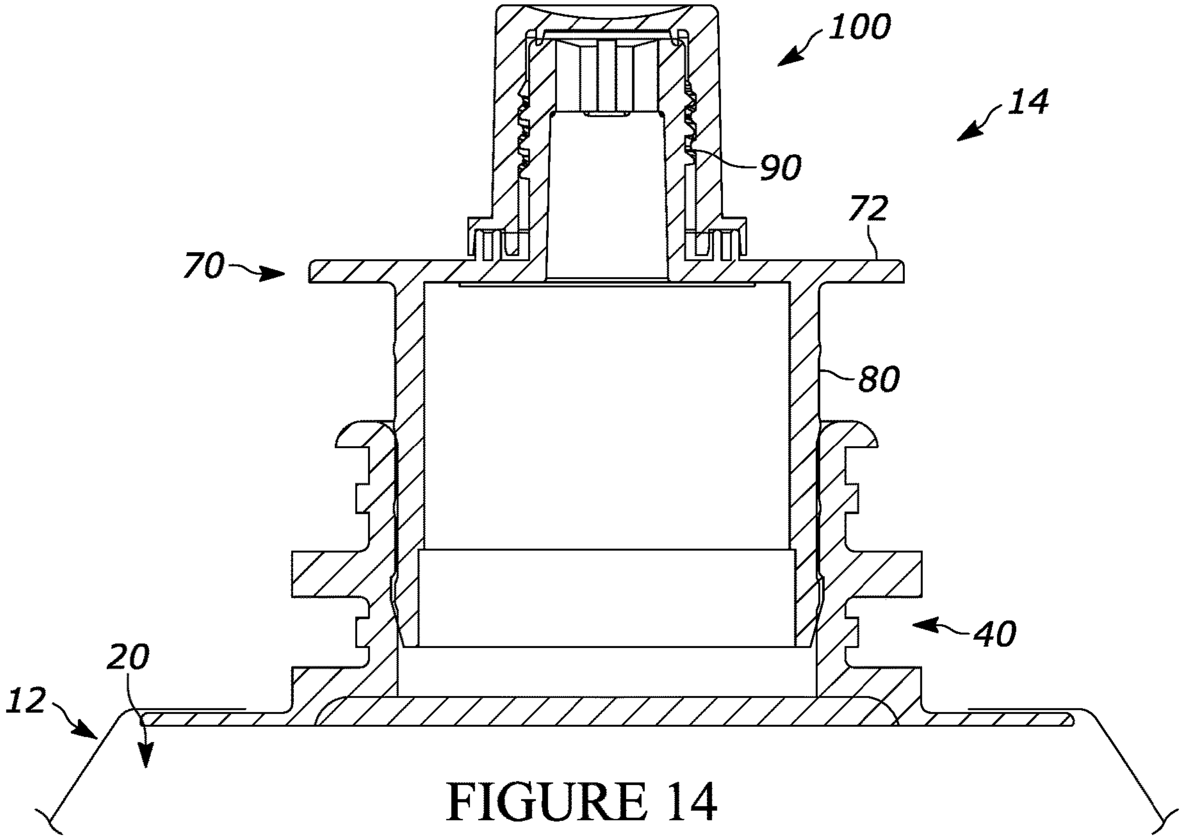
FIG. 14 of the drawings is a cross-sectional view of the flexible container assembly of the present disclosure, showing, in particular, the fitment assembly in a first position.
Figure 15:
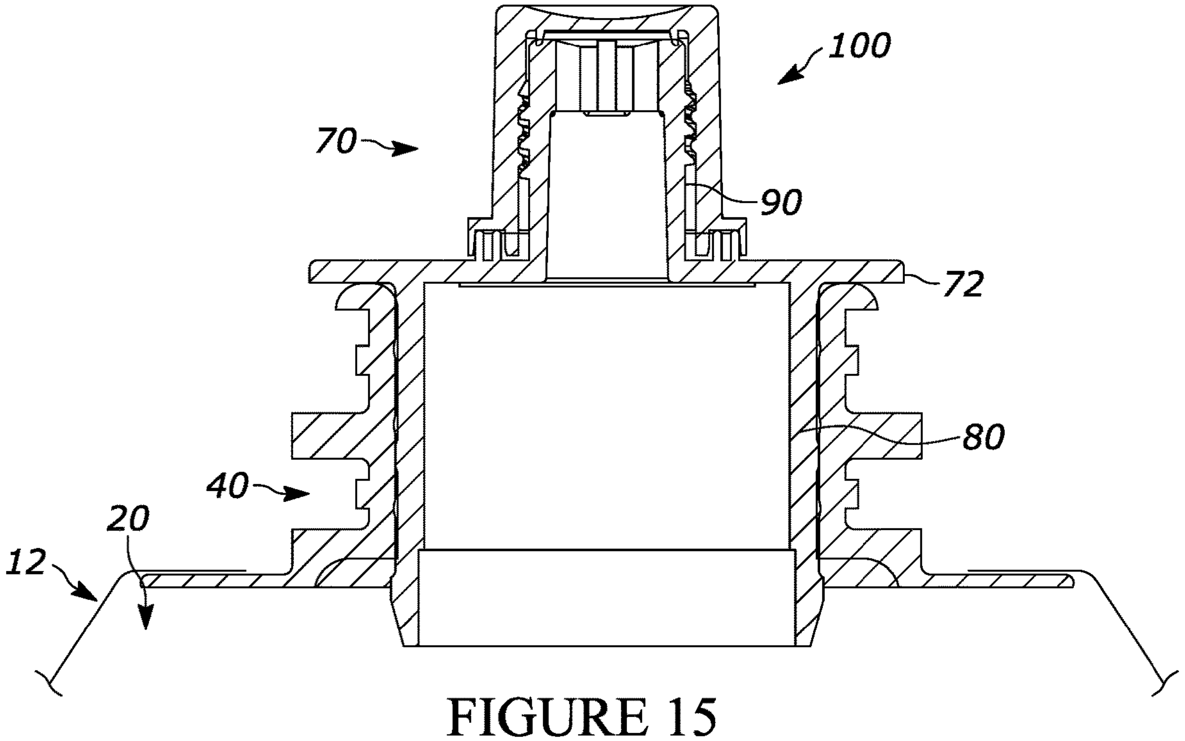
FIG. 15 of the drawings is a cross-sectional view of the flexible container assembly of the present disclosure, showing, in particular, the fitment assembly in a second position.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the flexible container system is shown generally at 10. The flexible container system includes bag assembly 12 and fitment assembly 14. The flexible container system is well suited for use for the storage and dispensing of flowable material used in the process of eternal feeding.

The bag assembly 12 is shown as comprising bag 20 and spout 40. The bag 20 includes a plurality of panels 22 of material (typically a polymer based laminate, coextrusion or combination thereof). In the configuration shown, the bag includes two panels 24 and 26 which may be of a single ply or which may be of multiple plies. A plurality of seals 28 couple the structures together to form a fluid tight cavity. In the configuration shown, the plurality of seals include side seals 30, 31, bottom seal 32, top seal 33 and angled seals such as first angled seal 34 and second angled seal 35, each of which extend from a side seal to the bottom seal on opposite sides of the opening 53 to which the spout 40 is coupled. In the configuration shown, a hanging opening is centrally located and extends through the top seal 33. It will be understood that in the configuration shown, the bag is symmetrical about an axis that vertically bisects the bag assembly. It will further be understood that in other configurations, the bag assembly may have a different configuration.

With reference to FIGS. 2, 3, 4, 5, 14, and 15, the spout 40 includes base flange 42 and upstand 44 (in this configuration a cylindrical upstand). The base flange 42 includes upper surface 46 and lower surface 48 and has a generally planar configuration which may be, for example, round, polygonal, or of similar configuration. The base flange is coupled to the bag (typically sealed through RF, heat or other welding processes, while adhesion and the like is also contemplated), and typically on the upper surface 46, although not required to be so configured. The spout provides fluid communication to the cavity defined by the bag.

The cylindrical upstand 44 extends from the base flange at proximal end 52 defining a lower rim 60 to a distal end 54, terminating at an upper rim 62. The cylindrical upstand 14 further includes outer surface 50 and inner surface 56. The outer surface 50 includes a plurality of flanges such as flanges 58, that are preferably parallel to the base flange and the upper rim of the upstand. In the configuration shown, these flanges are likewise circular in configuration, while other configurations are contemplated. The inner surface 56 includes an annular channel 64 disposed between the proximal and distal ends of the upstand 44.

With reference to FIGS. 2, 3, and 6 through 15, the fitment assembly 14 includes body 70 and cap 100. The body 70 includes base 72, depending skirt 80, upstanding spout 90 and tamper evident seal 98. As will be explained, the fitment assembly can be inserted into and attached to the upstand 44 of the spout 44 forming a hermetical seal therebetween, and preferably, in multiple slidable orientations (such as a partially inserted position and a fully seated position).

The base 72 comprises, in the configuration shown, a generally circular configuration that is substantially planar and includes upper surface 74 and lower surface 76. It is contemplated that, while shown as being substantially planar, other configurations are contemplated, such as, for example, various outwardly convex or outwardly concave surface, or a combination thereof.

With the configuration shown, and the relative size and position of the depending skirt and the upstanding spout, the base 72 includes an overhanging flange 78 which terminates in an outer perimeter 79.

The depending skirt, which will be understood to comprise a depending spout engaging skirt configured to sealingly engage the spout, depends from the lower surface 76 of the base and includes proximal end 81, distal end 82, outer surface 83 and inner surface 84. In the configuration shown, the depending skirt has a substantially cylindrical configuration, and the outer surface includes a plurality of annular sealing ribs 86, one of which comprises a lower locking rib 87.

The upstanding spout 90 extends upwardly from the upper surface 74 of the base and in a direction opposite the depending skirt 80. In the configuration shown, the base, the depending skirt and the upstanding spout are concentric so as to generally define a central axis of the skirt. It is contemplated that the structures may be offset relative to each other and not concentric. For example, the upstanding spout may be offset relative to the depending skirt and/or the base.

Figure 17:
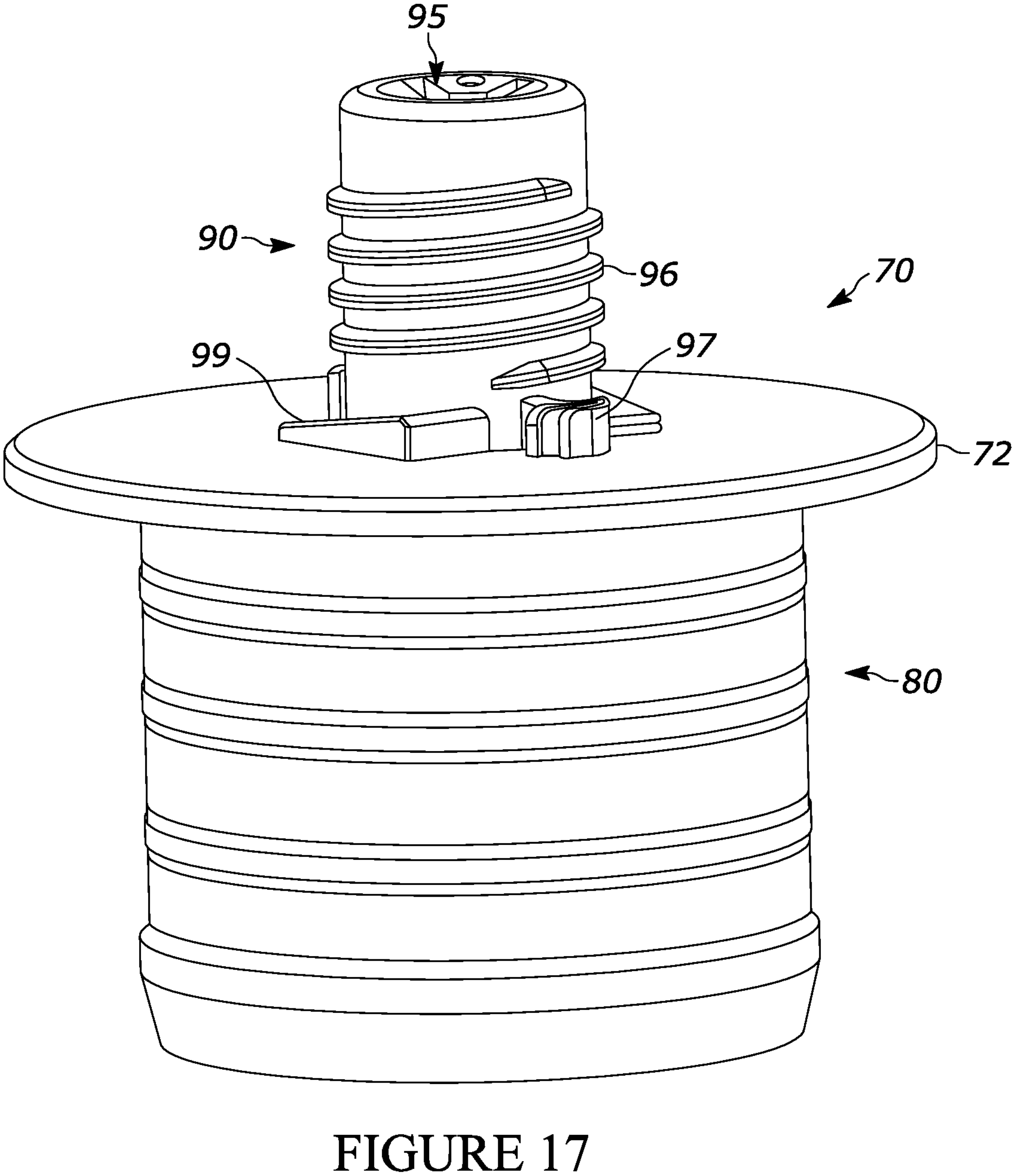
FIG. 17 of the drawings is a partial cross-sectional view of a configuration of the cap of the fitment assembly of the present disclosure.
Figure 18:
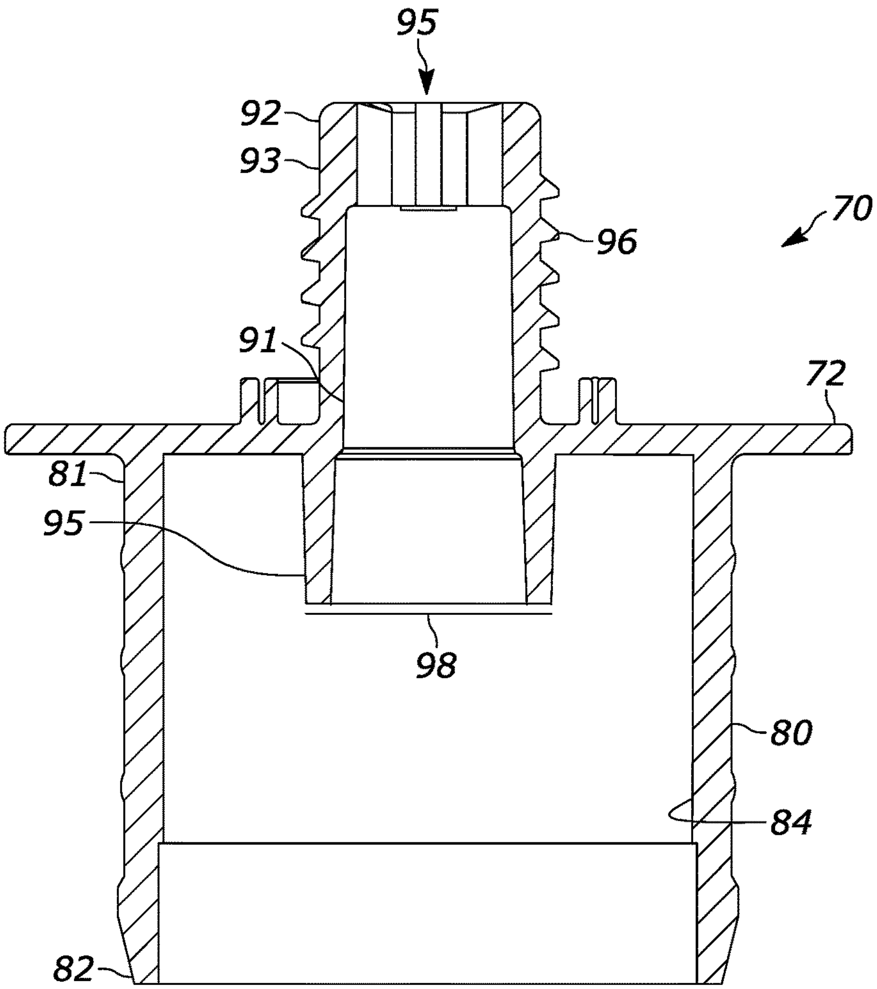
FIG. 18 of the drawings is a cross-sectional view of a configuration of the cap of the fitment assembly of the present disclosure.

The upstanding spout includes proximal end 91, distal end 92, outer surface 93, inner surface 94 and entry region 95. The upstanding spout has a generally cylindrical configuration, while other cross-sectional configurations are likewise contemplated for use. The outer surface 93 includes a plurality of threads 96 (or at least one thread) which may comprise a single, double or triple thread, for example. In some configurations, such as shown in FIGS. 17 and 18, the threads may continue to the tamper evident protrusions 97. Such a configuration provides additional grasping and retention between the upstanding spout and the cap and precludes relative movement when the cap is fully engaged. The entry cross-sectional configuration of the entry region 95 comprises a cross configuration, one of the types of which is disclosed in U.S. Pat. No. 9,925,120 B2 issued to Kropczynski et al, the entire disclosure of which is hereby incorporated by reference in its entirety. Such probes and the like are set forth in ISO standard 18250-3:2018(E), the specification of which is incorporated by reference in its entirety. In the configuration shown, the aperture 95 is generally cross-shaped and includes a circular center 252 and four wing extensions 254*a*, 254*b*, 254*c*, 254*d*. The exemplary wings are evenly spaced around the circumference of the circular center 252, and permit the connector to be inserted in four unique positions. Of course, other configurations for the spike insertion aperture may be utilized and should be considered to be within the scope of the present invention.

A plurality of tamper evident protrusions 97 are disposed on the upper surface 74 proximate the outer surface 93 of the upstanding spout 90. In the configuration, the upstanding tamper evident structures comprise a pair of structures which are on opposite sides of each other. Other configurations are likewise contemplated. Additionally, opposing ramp-like inclined wedge-like structures 99 are positioned on opposing sides of each other and a quarter turn out of phase from the tamper evident protrusions.

To block ingress into the depending skirt through the upstanding spout, a tamper evident seal 98 such as, for example, a foil seal extends over the opening formed in the body between the depending skirt and the upstanding spout, and is coupled to the lower surface 76 of the base of the body. It will be understood that when the tamper evident seal is pierced, there is fluid communication between the upstanding spout and the depending skirt through the base. In another configuration, and with reference to FIGS. 17 and 18, a depending spout 95 may extend downwardly from the base 72 opposite of the upstanding spout 90. In some such configurations, the diameter of the depending spout may have a larger cross-sectional area. In such a configuration, the tamper evident seal 98 may be positioned across the lower terminal end of the depending spout. Such a configuration allows for the use of the standard attachment, while allowing for threading to engage and begin prior to piercing the tamper evident seal.

Figure 19:
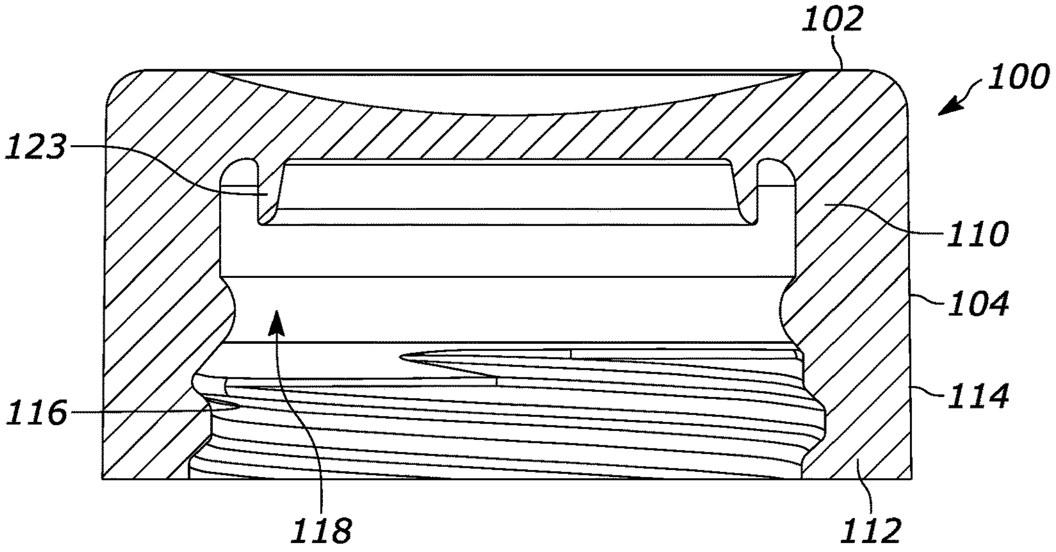
FIG. 19 of the drawings is a perspective view of the fitment assembly of the present disclosure.
Figure 20:
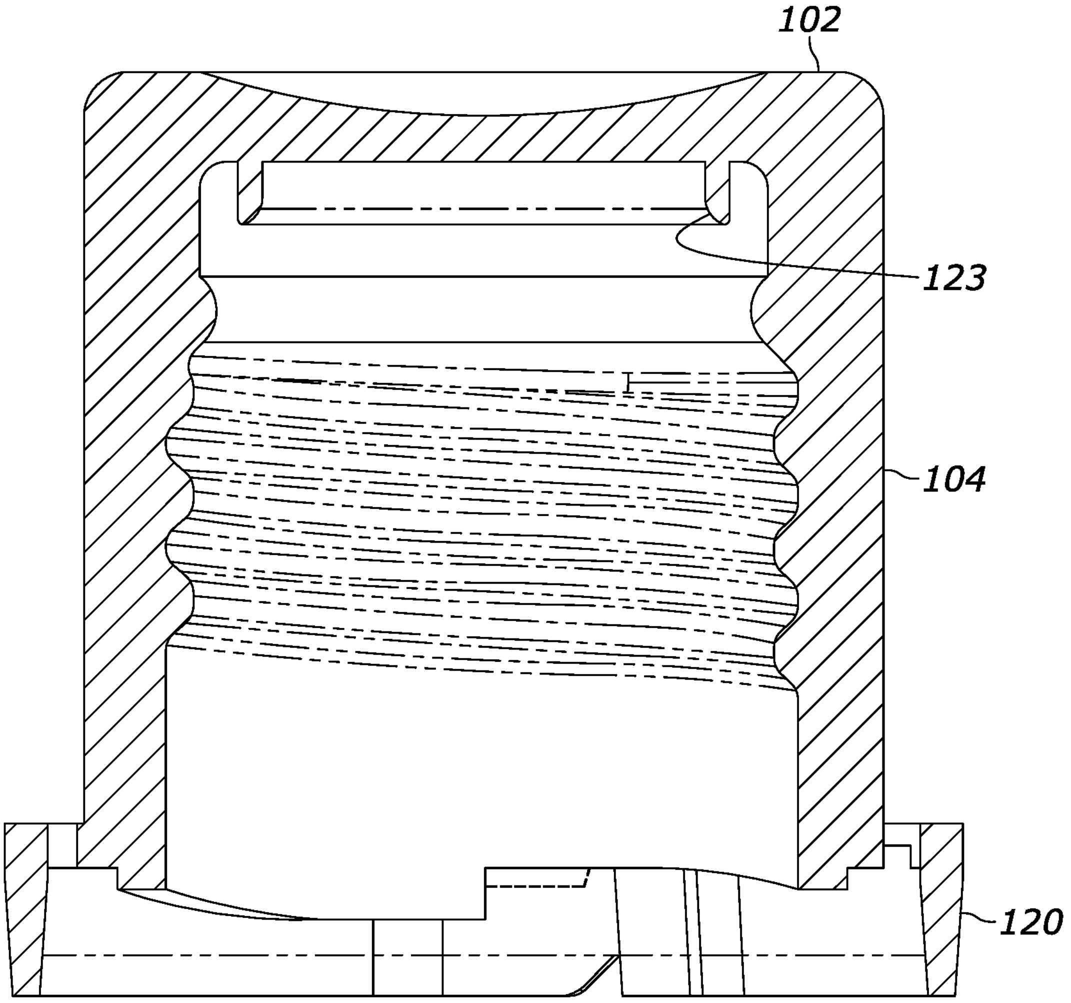
FIG. 20 of the drawings is a perspective view of the fitment assembly of the present disclosure.
Figure 21:
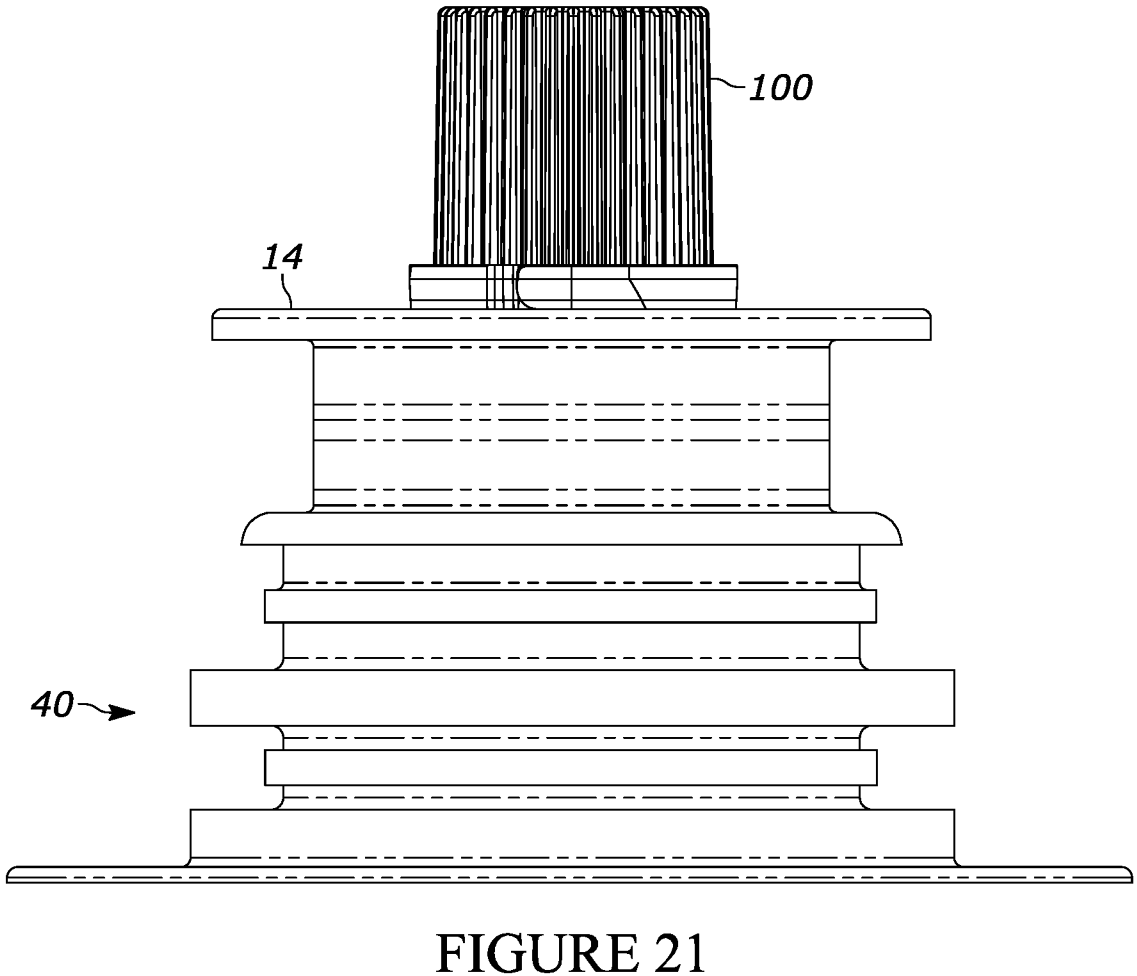
FIG. 21 of the drawings is a side elevational view of the spout assembly that is coupled to the flexible container, with the fitment assembly in a dust cap position.
Figure 22:
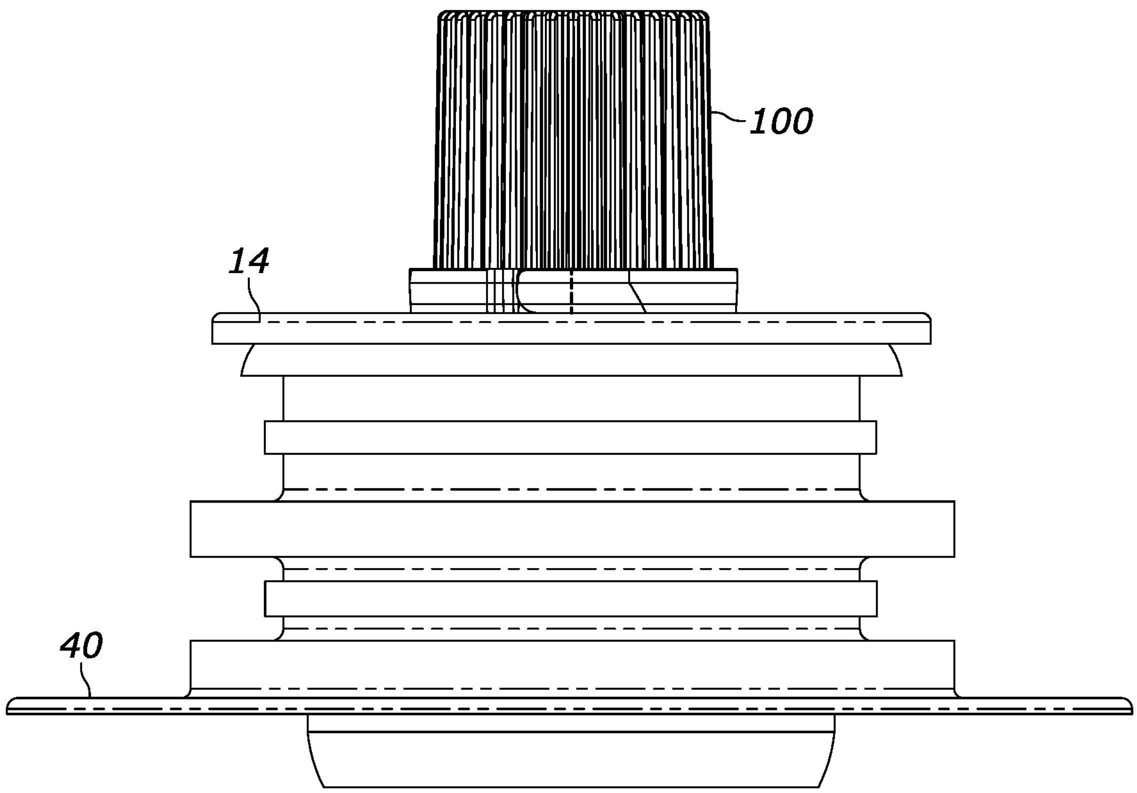
FIG. 22 of the drawings is a side elevational view of the spout assembly that is coupled to the flexible container, with the fitment assembly in the fully seated position.
Figure 23:
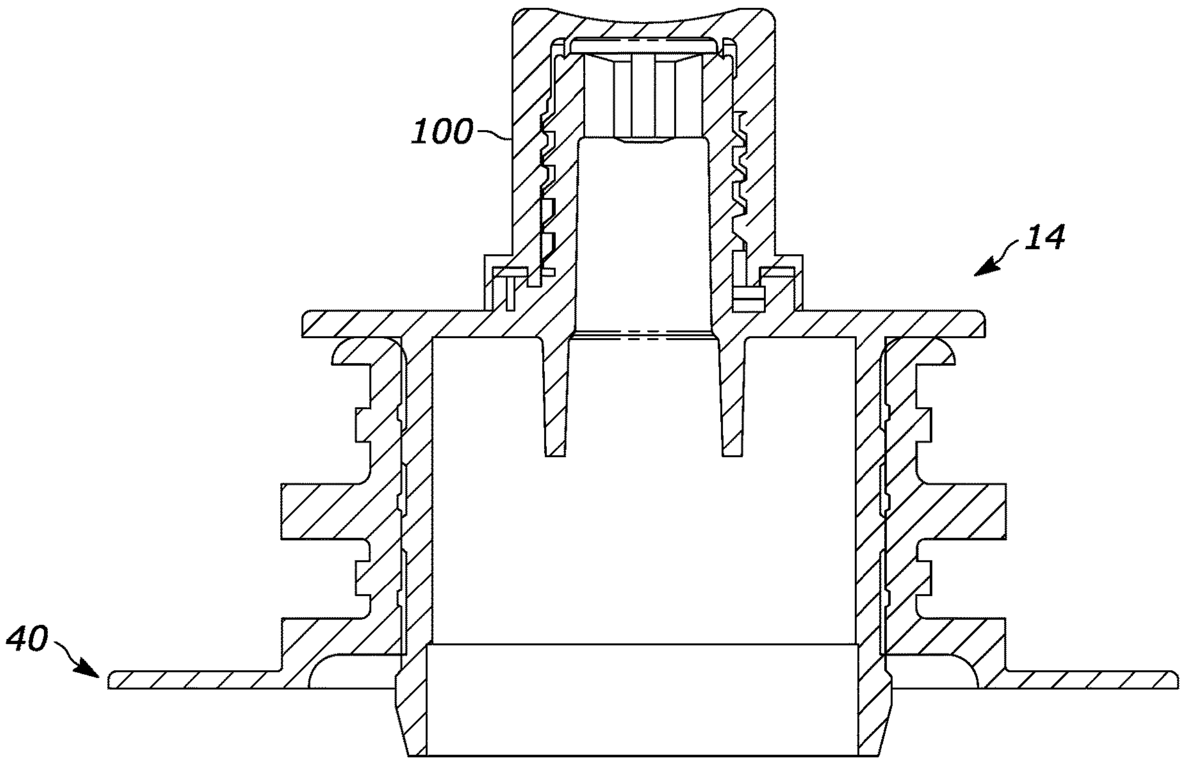
FIG. 23 of the drawings is a cross-sectional view of the spout assembly that is coupled to the flexible container, with the fitment assembly in the fully seated position.

With reference to FIGS. 12 through 15, the cap 100 includes top 102 and cap skirt 104. The top 102 comprises a generally circular member that includes inner surface 106 that has a sealing rim 108 that engages the distal end of the upstanding spout. The cap skirt 104 depends from the top 102 and includes upper end 110, lower end 112, outer surface 114, inner surface 116 and frangible portion 120. The inner surface 116 includes threads 118 that interface with the threads of the upstanding spout. In some configurations, with reference to FIGS. 19 and 20, a top cylindrical seal 123 (in the form of a bead, for example) may be presented at the upper end of the inner surface of the cap spaced apart from the threads and also from the depending ring emanating from the top of the cap. The top cylindrical seal provides a seal against the upstanding spout, and to reduce wabble between the cap and the upstanding spout, and to ensure that the tamper evident structures remain engaged. In the configuration shown, to provide additional sealing, the top cylindrical seal is engageable with the distal end of the upstanding spout outboard of the entry cross-sectional configuration.

The frangible portion 120 includes engaging fingers 122 which can engage with the tamper evident mating engagement 97 when the cap is spun in a first direction, and which are retained therewithin when the cap is spun in a second direction. One such construction is shown in in U.S. Pat. No. 9,751,677 B2 issued to Fiere et al, the entire disclosure of which is hereby incorporated by reference.

To fill the container assembly, the container assembly is first provided. The fitment assembly is provided with the cap threaded onto the upstanding spout and with the frangible portion 120 engaging the tamper evident mating engagement 97. The bag assembly is likewise provided. The spout is sealingly coupled to the bag in a fluid tight configuration so as to provide ingress to and egress from the cavity of the bag.

The fitment assembly is inserted into the spout and directed to a first position (often referred to as the dust cap configuration). In such a first position, the lower locking rib 87 of the depending skirt 80 of the fitment assembly engages the annular channel 64 of the cylindrical upstand 44 of the spout 40. In such a position, the base 72 is spaced apart from the upper rim of the cylindrical upstand of the spout.

The container assembly can be sterilized either prior to the coupling of the fitment, or after, through, for example, gamma radiation or the like. Other sterilization can be utilized on the outside of the container assembly as desired. The spout and fitment can be introduced into an aseptic filler, wherein, within an aseptic environment, the fitment can be removed from the spout, a fill valve can release a flowable material into the bag to fill up the bag. When filled to the desired level, the fill valve can be withdrawn or removed, and the fitment can be reinserted into the cylindrical upstand of the spout.

In this reinsertion, the fitment is directed into a second position (which may be referred to as the fully seated position). In such a position, the lower locking rib is directed through the cylindrical upstand and extends beyond the lower rim. When directed beyond the lower rim, due to the relative sizes, the lower locking rib may extend annularly outward of the lower rim of the cylindrical upstand, thereby increasing the force required to separate the fitment from the spout. The container assembly is now configured for use.

To utilize or dispense from the container assembly, the container assembly is first provided. The end user can remove the cap from the body of the fitment assembly. When the cap is spun to remove from the body, the frangible portion remains engaged with the tamper evident mating engagement until the force exerted by the user exceeds the force of the attachment of the frangible portion, at which time the frangible portion breaks. With the cap removed, but with the frangible portion broken, it is clear that if the cap is replaced, tampering has occurred because the frangible portion remains broken.

Figure 16:
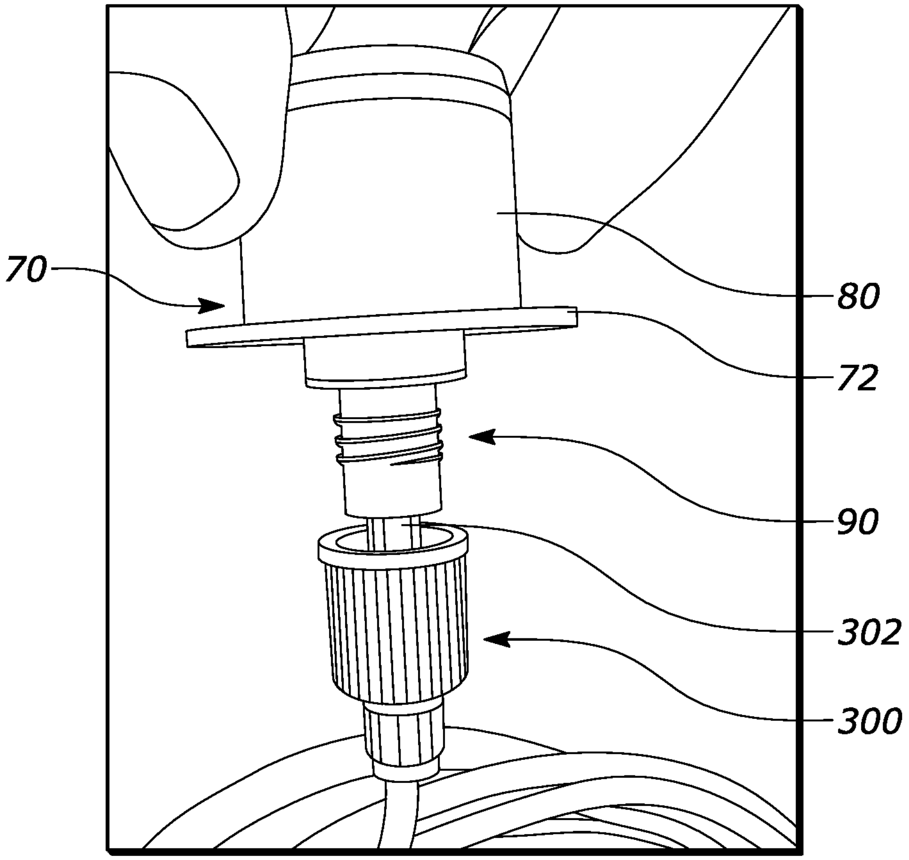
FIG. 16 of the drawings is a photograph of the fitment assembly with an exemplary probe and feeding tube with threaded fastener, as the probe portion is extended into the upstanding spout.
Figure 24:
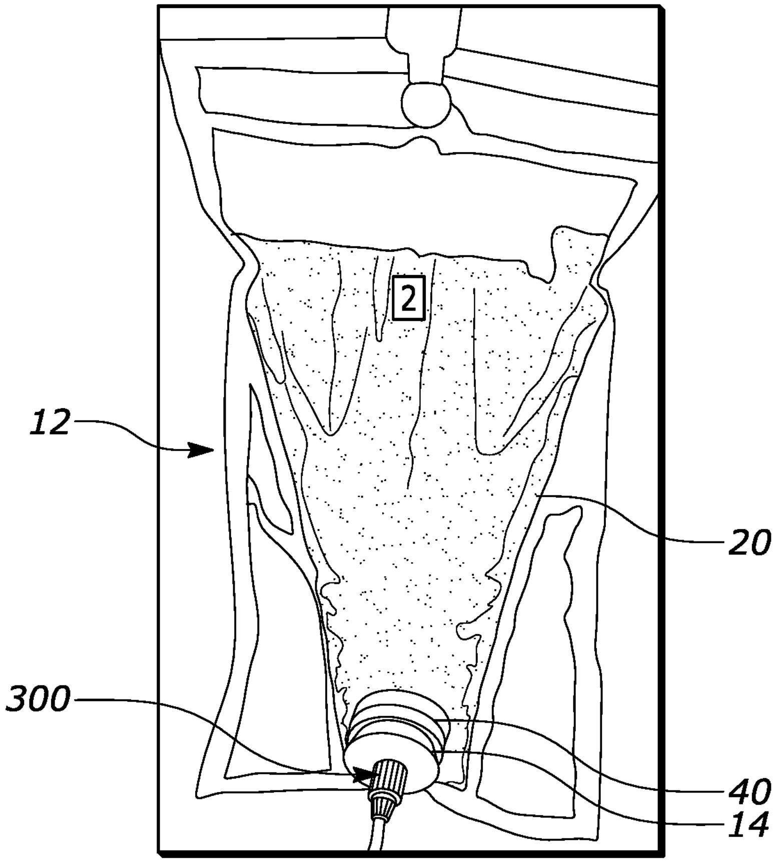
FIG. 24 of the drawings is a front elevational view of a flexible bag made in accordance with the present disclosure.

Next, with the cap removed, and with reference to FIG. 16, a probe assembly 300 having a probe 302 matching the shape of the entry 95 of the upstanding spout can be inserted therethrough. Eventually the probe encounters the tamper evident seal. Further insertion can break the tamper evident seal and provide access to the cavity of the container. If removed, a subsequent user can easily see that the tamper evident seal has been destroyed. It will be understood that the probe may be coupled to a cap-like structure, which can extend over the upstanding spout and which can be threadedly engaged therewith. The probe may have a tube which extends through the cap-like structure and which can be coupled thereto. At such time, the contents of the bag can be emptied through the tube of the probe. It will further be understood that the container assembly can be attached to a hook or other structure (FIG. 24) with the use of the hang opening 36 so as to be suspended over a patient, as the patient lies in a bed, sits in a chair or stands. Preferably the threading occurs prior to the piercing of the tamper evident seal so that spilling and detachment after piercing can be minimized.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A flexible container assembly comprising:

a bag assembly having a bag having at least one panel that is sealed with seals to form two overlying portions so as to define a cavity therebetween, the at least one panel having an opening extending through one of the two overlying portions spaced apart from the seals attaching the two overlying portions, and a spout sealed about the opening in the at least one panel so as to be in fluid communication with the cavity, the spout having an upstand extending from and perpendicular to a sealing portion base flange which is sealed to the at least one panel about the opening extending therethrough, the upstand further including an inner surface;

a fitment assembly releasably attachable to the spout, the fitment assembly comprising a base having a integrally formed depending skirt and an integrally formed upstanding spout, the depending skirt having an outer surface slidably insertable into the upstand of the spout and slidably movable along the inner surface of the spout, the depending skirt extending beyond the upstand and the base flange into the cavity and the depending skirt including at least one annular sealing rib extending circumferentially therearound, the at least one annular sealing rib sealingly interfacing with the inner surface of the spout in sealed engagement with the inner surface of the upstand of the spout of the bag assembly, the upstanding spout further comprising:

a proximal end at the base and a distal end spaced apart therefrom defining an outer surface, with threads extending about the outer surface between the proximal end and the distal end, and, an entry cross-sectional configuration at the distal end, a depending spout extending from the base integrally formed and being concentric therewith, the depending spout being spaced apart from the integrally formed depending skirt and the upstand of the spout, and, a lower end thereof terminating within a confine of the integrally formed depending skirt, the depending spout extending sufficiently from the base so that a probe adapted for attachment to the fitment engages the threads of the outer surface prior to passing beyond the lower end of the depending spout, while passing beyond the lower end of the depending spout when fully coupled, and the depending spout having a cross-sectional area that is larger than a cross-sectional area of the upstanding spout.

2. The flexible container of claim 1, wherein the entry cross-sectional configuration at the distal end includes an aperture that has a circular center with four wing extensions that are evenly spaced around a circumference of the circular center.

3. The flexible container of claim 2 wherein the upstanding spout has a cross-sectional configuration that is substantially smaller than the cross-sectional configuration of the upstand.

4. The flexible container of claim 3 wherein the upstand is cylindrical and the upstanding spout is cylindrical with the upstand and the upstanding spout being concentric.

5. The flexible container of claim 2 wherein opposite the spout a hanging opening is provided for purposes of hanging the bag assembly in operation.

6. The flexible container of claim 2 further comprising a cap threadedly engageable with the threads of the upstanding spout.

7. The flexible container of claim 6 wherein the cap further includes an inner surface having an upper end, with a top cylindrical seal depending from the upper end and engageable with the distal end of the upstanding spout outboard of the entry cross-sectional configuration.

8. The flexible container of claim 7 wherein the fitment assembly further includes a tamper evident mating engagement on the base thereof, and the cap includes engaging fingers configured to engage the tamper evident mating engagement on the base, and further, wherein a tamper evident seal extends across a lower terminal end of the depending spout.

9. The flexible container of claim 1 wherein the depending spout is concentric with the upstanding spout.

10. The flexible container of claim 1 wherein the depending spout is concentric with the upstanding spout and a tamper evident seal extends across the lower terminal end of the depending spout.

11. The bag assembly of claim 10 wherein the lower terminal end of the depending spout is substantially parallel to the base of the fitment assembly.

12. A method of attaching a probe to a spout comprising the steps of:

providing the flexible container assembly of claim 1, and having a tamper evident seal extending across the upstanding spout;

directing a probe through the entry cross-sectional configuration, the probe includes a plurality of threads that are engageable with the threads of the upstanding spout;

engaging the threads of the upstanding spout with the threads of the probe;

piercing the tamper evident seal with the probe after the step of engagement; and sealingly coupling the probe with the upstanding spout.

13. The method of claim 12 wherein the flexible container assembly further includes a cap attached to the upstanding spout, the method further comprising the step of: removing the cap prior to the step of directing the probe.

14. A fitment assembly attachable to a bag having a spout, the fitment assembly comprising:

a base defining an outer perimeter;

a depending skirt integrally formed with and depending from the base and having an outer surface with at least one sealing rib extending therearound, the depending skirt spaced apart from the outer perimeter of the base so as to sealingly engage the spout of the bag upon insertion thereinto; and an upstanding spout integrally formed with and extending from the base opposite the depending skirt, wherein the depending skirt is insertable into and sealingly engageable with an inner surface of the spout of the bag, the upstanding spout further comprising:

a proximal end at the base and a distal end spaced apart therefrom defining an outer surface, with threads extending about the outer surface between the proximal end and the distal end;

an entry cross-sectional configuration at the distal end, the entry cross-sectional configuration at the distal end includes an aperture that has a circular center with four wing extensions that are evenly spaced around the circumference of the circular center; and a depending spout extending from the base in a direction opposite the upstanding spout, the depending spout integrally formed with the base and spaced apart from the depending skirt, a lower end of the depending spout terminating within a confine of the depending skirt, the depending spout extending sufficiently from the base so that a probe adapted for attachment to the fitment engages the threads of the outer surface prior to passing beyond the lower end of the depending spout, while passing beyond the lower end of the depending spout when fully coupled, the depending spout having a cross-sectional area that is larger than the upstanding spout.

15. The fitment assembly of claim 14, wherein the depending spout is concentric with the upstanding spout.

16. The fitment assembly of claim 14 wherein a tamper evident seal extends across the lower terminal end of the depending spout.

17. The fitment assembly of claim 14 further comprising a cap threadedly engageable with the threads of the upstanding spout.

18. The fitment assembly of claim 17 wherein the cap further includes an inner surface having an upper end, with a top cylindrical seal depending from the upper end and engageable with the distal end of the upstanding spout outboard of the entry cross-sectional configuration, and further including a sealing rim extending circumferentially about the inner surface, extending inwardly beyond the threads and positioned between the threads and the top cylindrical seal, the sealing rim engaging the distal end of the upstanding spout upon engagement.

19. The flexible container of claim 18 wherein the fitment assembly further includes a tamper evident mating engagement on the base thereof, and the cap includes engaging fingers configured to engage the tamper evident mating engagement on the base, and further includes a tamper evident seal that extends across a lower terminal end of the depending spout.

* * * * *